United States Patent Office 3,290,396
Patented Dec. 6, 1966

3,290,396
ALCOHOL IMPROVEMENT BY SEQUENTIAL
CONTACTING WITH SILICA GEL
Charles M. Starks and Raymond D. Eccles, Ponca City,
Okla., assignors to Continental Oil Company, Ponca
City, Okla., a corporation of Oklahoma
No Drawing. Filed Aug. 30, 1963, Ser. No. 305,822
5 Claims. (Cl. 260—643)

This invention relates to removal of alkandiols from admixture with alkanols. Particularly it relates to removing odor precursors from the alcohols obtained by the hydrolysis of the product of the oxidation of aluminum trialkyls, i.e., with respect to the odor quality of sulfates prepared therefrom.

It has been observed that alkanols (saturated aliphatic hydrocarbon monohydric alcohols) frequently contain substantial amounts of alkandiols (saturated aliphatic hydrocarbon dihydric alcohols) of roughly the same boiling point or range. Since these two classes of alcohols have different physiological and chemical behaviors, it is desirable to separate the mixture. This has not been easy to accomplish.

Recently a new commercial source of monohydric alcohols has appeared. These alcohols are the product of the hydrolysis of the reaction product of oxygen and aluminum trialkyl. A commercial process is described in Encyclopedia of Chemical Technology, Kirk-Othmer, editors, vol. I, 2nd ed. (1963) for the production of Alfol alcohols. "Alfol" is a registered trademark of Continental Oil Company. It is stated these alcohols include by-products such as esters, ethers, acids, aldehydes, etc.

Pure primary alcohols produce sulfates having a bland, innocuous odor, which odor is desired by the sulfate producers. Alcohols sulfates, both alkyl hydrogen sulfates and alkali metal sulfates, produced from these aluminum trialkyl hydrolysis-oxidation products have a typical odor and degree of intensity and unpleasantness. Recent work has established that much of the odor of aluminum alkyl derivative alcohols is caused by the presence in the alkanol mixture of alkandiols, as an impurity; these diols are converted by the sulfation operation to compounds having an intensely disagreeable odor; even tiny amounts of these diols result in highly odorous sulfate products.

An object of the invention is a process for separating alkandiols from alganols. A particular object is the separation of alkandiols when they are present in "impurity" amounts. A preferred object is the removal of odor-precursors from alcohols made from aluminum alkyl-oxygen reaction products, to improve the odor quality of sulfates made therefrom. Other objects will become apparent in the course of the detailed description of the invention.

The process of the invention is especially beneficial to sulfate odor quality of the alcohols (alkanols) produced by hydrolysis of the reaction product of oxygen and aluminum trialkyl. Commonly these are even carbon number, straight chain, saturated primary monohydric alcohols having at least 6 carbon atoms. While these alcohols are readily available up to about 30 carbon atom number and more, those used for sulfate production are usually below about 22 carbon atom number. Although products are available which include essentially, only one carbon atom number alcohol, e.g., 1-hexanol, 1-octanol, 1-tetradecanol, it is customary to use mixtures of two or more alcohols. A common mixture includes alcohols having 6, 8 and 10 carbon atoms; another mixture includes 12 and 14 carbon atom alcohols; another mixture includes 16 and 18 carbon atom alcohols. In the case of these mixtures, usually some small amount of lower and higher carbon atom number alcohols are present; thus the 6–10 alcohol may include some 4 and/or 12 carbon atom number alcohol; the 12–14 alcohol may include some 10 and/or 16 carbon atom alcohol; the 16–18 alcohol may include some 14 and/or 20 and 22 carbon atom alcohols.

The alkandiol, hereinafter sometimes referred to as diol, includes a single diol, a number of isomers, or a mixture of diols of different carbon atom number. The diol may be described as a compound having only carbon and hydrogen atoms in addition to two hydroxy substituents. The hydroxy groups may be terminal or positioned elsewhere in the chain. The alkandiols having 2–14 carbon atoms are a preferred charge to the process.

It has been observed that the alcohols derived from the oxidation of aluminum trialkyl include deleterious amounts of diol; specifically, hexandiol is associated with 1-decanol; octandiol (ca. 250° C. B.P.) is associated with 1-dodecanol (256° C. B.P.); decandiol is associated with 1-tetradecanol. The diol impurity-type and amount, is dependent on the distillation sharpness used in cutting up the broad range of alcohols produced via the hydrolysis-oxidation of aluminum trialkyl growth product, i.e. the product of the addition of ethylene to a lower molecular weight aluminum trialkyl.

The process of the invention involves contacting of the liquid alcohol mixture (alkanol and alkandiol) with a solid sorbent. This sorbent is particulate silica gel. The silica gel is the well-known porous material obtained by precipitation of a hydrosol of silica and dehydration of the precipitated gel.

The contacting may be carried out at any temperature at which the alcohol charge is in the liquid state. Commonly the temperature will fall within the range of 10°–150° C. In the case of the aluminum trialkyl derivative alcohols containing only minor impurity amounts of diols, temperatures of 10°–60° C., and especially room temperature (20°–30° C.), are suitable.

The contacting may be carried out by any of the procedures known to this liquid-solid sorption separation art. For example a fixed bed of sorbent may be used; or a mixture of sorbent particles and the liquid feed may be intermingled and then the sorbent separated from the liquid product.

Example I

The process is illustrated with a preformed charge which duplicates closely a typical 1-alkanol alcohol derived from aluminum trialkyl-ethylene growth product. A blend was made up of pure 1-dodecanol (55 volume percent), 1-tetradecanol (45%) and 0.1% of tritiated 1,5-octandiol. The tritium was all attached to carbon atoms; no oxygen tritium groups were present.

The liquid charge was contacted in a mechanical shaker at room temperature (20°–25° C.) for six hours with 5 weight percent, on liquid charge, of silica gel particles. The gel was separated from the liquid product (filtrate) by vacuum filtration to remove as much as possible of occluded alcohol. The filtrate was assayed for tritium activity; the tritium activity is proportional to octandiol content.

A sequential batch contacting was simulated by contacting the filtrate with a fresh portion of the gel (5%), filtering and assaying for octandiol content. A third contacting was carried out on the second filtrate using fresh gel (5%).

The results of these three sequential contactings were:

| Filtrate No.— | Diol content of filtrate |
|---|---|
| 0 | 0.10 |
| 1 | 0.04 |
| 2 | 0.02 |
| 3 | 0.01 |

Example II and comparison tests

Here the efficiency and the selectivity of silica gel and alumina was measured. The charge of Example I was used under the conditions set out in Example I. The diol removed was determined by tritium assay and the sorption of 1-alkanol was determined by weight balance on liquid in and out of the contacting. Three sequential contactings of the charge were made following the procedure of Example I. The percent of diol removed in each stage was then averaged for the three contactings. The percent of alkanol sorbed was averaged for contactings 1 and 2. An arbitrary ratio of weight percent of alkanol sorbed by the amount of sorbent used, to weight percent of diol sorbed by the amount of sorbent used, was taken as a measure of selectivity—the smaller this ratio the better the selectivity.

| Sorbent | (1) Diol Sorbed, Percent | (2) Alkanol Sorbed, Percent | (3) Ratio 2/1 |
|---|---|---|---|
| Silica gel | 52 | 4.1 | 0.08 |
| Alumina (Alcoa) | 20 | 5.1 | 0.25 |
| Alumina (Calcined) | 10 | 15.0 | 0.86 |

Example IIIa 1214 alcohol was contacted with 5 weight percent of silica gel under the conditions of Example I. The odor of the sulfate prepared from the contacted alcohol was rated as typical of Alfol alcohol and of level 1–2; a considerable improvement.

Example IIIb

Example IIIa was repeated except that 5 sequential contactings were made. The sulfate prepared from the contacted alcohol was rated as: typical and of pleasant, bland intensity.

Thus having described the invention, what is claimed is:

1. A process for the improvement of the odor quality of alkanols for use in the production of alkanol sulfate which process comprises:
    contacting at a temperature of about 10°–60° C., (1) a liquid alkanol, having at least 6 carbon atoms and being an even-number, straight chain, primary alkanol product of the hydrolysis of the reaction product of oxygen and aluminum trialkyl growth product, said alkanol containing alkandiol impurity in an amount sufficient to degrade the odor of sulfate made from said alkanol sequentially with (2) a plurality of fresh amounts of particulate silica gel sorbent; and separating liquid alkanol of the desired improved sulfate odor quality from the last amount of sorbent.

2. The process of claim 1 wherein said alkanol has 6–30 carbon atoms.

3. The process of claim 2 wherein said alkanol is essentially a mixture of 6–10 carbon atom alkanols.

4. The process of claim 2 wherein said alkanol is essentially a mixture of 12–14 carbon atom alkanols.

5. The process of claim 2 wherein said alkanol is essentially a mixture of 16–18 carbon atom alkanols.

References Cited by the Examiner
UNITED STATES PATENTS
2,965,680  12/1960  Anderson et al. _____ 260—643

LEON ZITVER, *Primary Examiner.*

J. E. EVANS, *Assistant Examiner.*